(12) United States Patent
Uchiyama et al.

(10) Patent No.: US 7,275,922 B2
(45) Date of Patent: Oct. 2, 2007

(54) CONTROLLER FOR AN EJECTOR MECHANISM IN AN INJECTION MOLDING MACHINE

(75) Inventors: Tatsuhiro Uchiyama, Gotenba (JP); Yuichi Hosoya, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 342 days.

(21) Appl. No.: 11/157,805

(22) Filed: Jun. 22, 2005

(65) Prior Publication Data

US 2005/0285289 A1    Dec. 29, 2005

(30) Foreign Application Priority Data

Jun. 23, 2004 (JP) ............................... 2004-184986

(51) Int. Cl.
*B29C 45/80* (2006.01)
(52) U.S. Cl. .................... 425/139; 264/334; 425/165; 425/556
(58) Field of Classification Search ................ 425/139, 425/165, 556; 264/334, 335, 336
See application file for complete search history.

(56) References Cited

U.S. PATENT DOCUMENTS

| 6,062,843 | A | 5/2000 | Yamaura | |
| 6,435,855 | B1* | 8/2002 | Sakurai | ...................... 425/139 |
| 6,533,972 | B1 | 3/2003 | Stirn | |
| 7,086,851 | B2* | 8/2006 | Ickinger et al. | ............. 425/556 |
| 7,156,649 | B2* | 1/2007 | Hattori et al. | ............... 425/556 |
| 7,168,945 | B2* | 1/2007 | Chen et al. | ................. 425/556 |

FOREIGN PATENT DOCUMENTS

| EP | 0 738 577 | 10/1996 |
| EP | 1 205 291 | 5/2002 |
| EP | 1 382 429 | 1/2004 |
| JP | 56-146713 | 11/1981 |
| JP | 10296818 | 11/1998 |

OTHER PUBLICATIONS

European Search Report in corresponding EP Application No. 05253887.3-2307 dated Jan. 27, 2006.

* cited by examiner

*Primary Examiner*—Tim Heitbrink
(74) *Attorney, Agent, or Firm*—Staas & Halsey LLP

(57) ABSTRACT

A controller and a method for an ejector mechanism in an injection molding machine for appropriately setting a terminal position of a forward motion of ejector pins of the ejector mechanism. The terminal position of the forward motion is set to a position where an elastic force of return springs does not exceed a retaining force of a brake device for retaining the ejector pins at the terminal position. The elastic force of the springs are detected during the ejector pins are moved forward. A position of the ejector pins immediately before the detected elastic force of the springs exceeds the retaining force of the brake device is determined and displayed on a display device as a criterial position. The terminal position of the forward motion of the ejector pins is set not to exceed the determined criterial position.

6 Claims, 4 Drawing Sheets

CONTROLLER FOR AN EJECTOR MECHANISM IN AN INJECTION MOLDING MACHINE

BACKGROUND OF THE INVENTION

1. Field of the Invention

The present invention relates to a controller of an ejector mechanism for ejecting a molded product from a mold in an injection molding machine, and also to a method of setting a terminal position of a forward motion of ejector pins of the ejector mechanism.

2. Description of Related Art

In an injection molding machine, after resin is injected into a mold and concreted, the mold is opened and a molded product in the mold is ejected by an ejector mechanism. The ejector mechanism ejects a molded product by moving ejector pins forward to project into a cavity of the mold against an elastic force of return springs for returning the ejector pins to a retracted position. A pneumatic cylinder, a linear motor or a servomotor may be employed as a driving source for moving the ejector pins forward. A brake device is used for generating a retaining force to retain the ejector pins at a terminal position of the forward motion against the elastic force of the springs (see JP10-296818A, for example).

Since the brake device retains the ejector pins at the terminal position against the elastic force of the springs by the retaining force, the retaining force has to be greater than the elastic force of the springs at the terminal position of the forward motion of the ejector pins. If the elastic force of the springs is greater than the retaining force of the brake device in a state where the ejector pins are retained at the terminal position, friction members for generating braking force, such as a brake shoe and a brake band of the brake device are excessively worn to make a cause of malfunction of the brake device.

SUMMARY OF THE INVENTION

The present invention provides a method of setting a terminal position of a forward motion of ejector pins of an ejector mechanism of an injection molding machine and a controller for controlling the ejector mechanism which enable setting of the terminal position of the forward motion of the ejector pins such that an elastic force of springs for returning the ejector pins to a retracted position does not exceed a retaining force of the brake means for retaining the ejector pins at the terminal position.

The method of the present invention is provided for setting a terminal position of a forward motion of ejector pins of an ejector mechanism having means for moving the ejector pins forward to project into a mold, springs for generating an elastic force to return the ejector pins to a retracted position, and brake means for generating a retaining force to retain the ejector pins at the terminal position. The method comprises: moving the ejector pins forward from the retracted position in a state where no molded product is present in the mold; detecting the elastic force of the springs during the forward motion of the ejector pins; determining a criterial position of the ejector pins where the detected elastic force of the springs is equivalent to the retaining force of the brake means; and setting the terminal position of the forward motion of the ejector pins closer to the retracted position than the determined critical position.

A controller of the present invention controls an ejector mechanism of an injection molding machine having means for moving ejector pins forward to project into a mold, springs for generating an elastic force to return the ejector pins to a retracted position, and brake means for generating a retaining force to retain the ejector pins at a terminal position of the forward motion. According to an aspect of the invention, the controller comprises: position detecting means for detecting a position of the ejector pins; elastic force detecting means for detecting an elastic force of the springs during a forward motion of the ejector pins from the retracted position; determining means for determining a criterial position of the ejector pins where the detected elastic force of the springs is equivalent to the retaining force of the brake means; and display means for displaying the detected criterial position of the ejector pins for setting the terminal position of the forward motion of the ejector pins. Referring to the detected criterial position, an operator can set the terminal position of the forward motion of the ejector pins closer to the retracted position than the determined critical position.

According to another aspect of the invention, the controller comprises: position detecting means for detecting a position of the ejector pins; elastic force detecting means for detecting an elastic force of the springs during a forward motion of the ejector pins from a retracted position; determining means for determining a criterial position of the ejector pins where the detected elastic force of the springs is equivalent to the retaining force of the brake means; and means for issuing an alarm if a preset terminal position of the forward motion of the ejector pins is remoter from the retracted position than the criterial position of the ejector pins. Thus, if the terminal position of the forward motion of the ejector pins is preset where the springs generate the elastic force greater than the retaining force of the brake means, an alarm is issued to prompt an operator to alter the preset terminal position of the forward motion of the ejector pins where the springs generate the elastic force not greater than the retaining force of the brake means.

According to still another aspect of the invention, the controller comprises: position detecting means for detecting a position of the ejector pins; elastic force detecting means for detecting an elastic force of the springs during a forward motion of the ejector pins; determining means for determining a position of the ejector pins immediately before the detected elastic force of the springs exceeds the retaining force of the brake means in the forward motion of the ejector pins; and means for altering a preset terminal position of the forward motion of the ejector pins to be the determined position, if the preset terminal position of the forward motion the ejector pins is remoter from the retracted position than the determined position. Thus, if the terminal position of the forward motion of the ejector pins is preset where the springs generate the elastic force greater than the retaining force of the brake means, the preset terminal position of the forward motion of the ejector pins is automatically altered to the determined position where the springs generate the elastic force not greater than the retaining force of the brake means.

The elastic force detecting means may detect the elastic force of the springs based on a electric current of a servomotor for driving the ejector pins to move forward, or by an observer for estimating a load exerted on the servomotor, or by a strain gauge provided in the ejector mechanism.

According to the present invention, the terminal position of the forward motion of the ejector pins is set to an appropriate position where the return springs generate the elastic force not greater than the retaining force of the brake device, so that the brake device is prevented from excessively wearing to reduce a cause of malfunction of the brake device.

DETAILED DESCRIPTION

Figure 1:
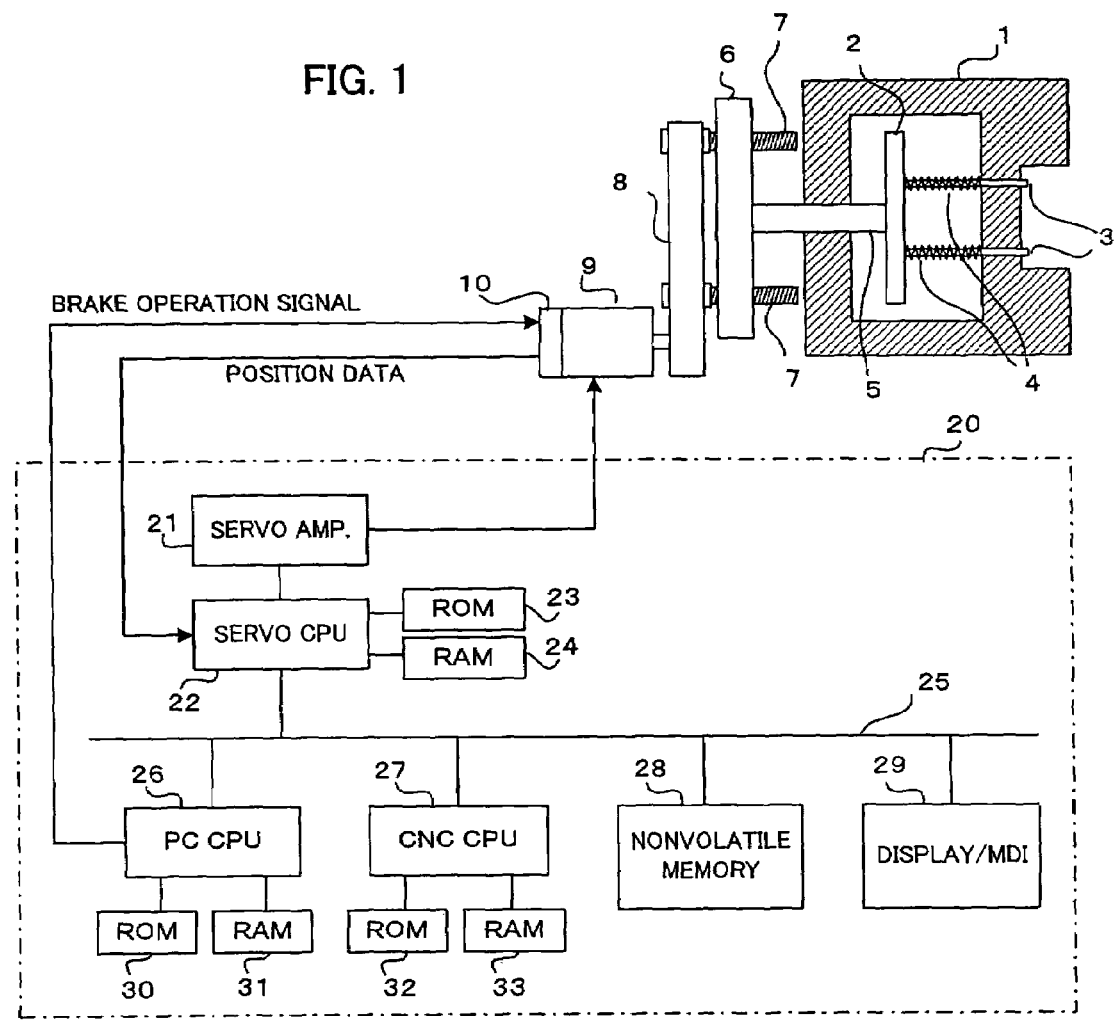
FIG. 1 is a schematic diagram of an ejector controller of the present invention.

In FIG. 1, an ejection plate 2 having ejector pins 3 thereon is arranged in a mold 1. The ejector pins 3 are moved forward to project into a cavity of the mold 1 to eject a molded product stuck in cavity of the mold 1. Springs 4 are inserted onto the ejector pins 3 to be arranged between the ejector plate 2 and an inner wall of the mold 1 to generate an elastic force to urge the ejector pins 3 and the ejector plate 2 to retract from the cavity of the mold 1 to a retracted position.

An ejector rod 5 is connected to the ejector plate 2 to move the ejector pins 3 forward with the ejector plate 2 (in a right direction in FIG. 1 to project the ejector pins 3 into the cavity) against the elastic force of the springs 4. A proximal end of the ejector rod 5 is fixed to a mounting plate 6 which has ball-nuts engaged with ball-screws 7. The ball-screws 7 are driven by a servomotor 9 having a built-in brake device through a transmission mechanism such as a timing belt. A position/velocity detector 10 is provided at the servomotor 9 to detect a rotational position of the motor to obtain a position and a velocity of the ejector pins 3.

An ejector controller 20 for controlling the ejector mechanism is constituted using a controller for controlling the injection molding machine.

The controller 20 has a CNC CPU 27 which serves as a microprocessor for numerical control, a PC CPU 26 which serves as a microprocessor for programmable control, and a servo CPU 22 which serves as a microprocessor for servo control, connected with one another by a bus 25 to enable information transmission in between by selecting input/output to/from the processors.

The PC CPU 26 is connected to a ROM 30 storing a sequence program for controlling sequential motions of the injection molding machine, and a RAM 31 for temporary storage of calculation data, and the CNC CPU 27 is connected to a ROM 32 storing an automatic operation program for generally controlling the injection molding machine and a RAM 13 for temporary storage of calculation data.

The servo CPU 22 is connected to a ROM 23 storing a control program dedicated for servo control for performing position, velocity and current control, and a RAM 24 for temporary storage of data. Further, the servo CPU 22 is connected to a servo amplifier 21 of the servomotor 9 for driving the ejector mechanism according to a command from the CPU 22 and an output from the position/velocity detector 10 attached to the servomotor 9 is fed back to the servo CPU 22. The rotational position of the servomotor 9, i.e. the position of the ejector pins 3 is updated based on the feedback signal of the position from the position/velocity detector 10 and stored in a present position storage register. Servo amplifiers of servomotors for driving a mold clamping mechanism and an injection mechanism connected to the servo CPU 22 are omitted in FIG. 1.

A non-volatile memory 28 which is a data storage RAM is connected to the bus 25 and serves as a molding data storage memory for storing molding conditions regarding injection molding operations, various set values, parameters, and macro variables. Regarding to the present invention, a preset retaining force of the brake device and a preset terminal position of the forward motion of the ejector pins are stored in the non-volatile memory 28.

Further, a manual data input (MDI) device 29 with a display device is connected to the bus 25. The MDI device 29 is capable of performing screen display of graphs and functional menus, and input of various data with numeral keys and various function keys. The display device may be constituted by a CRT, a liquid crystal display, etc.

The above hardware constitution of the controller is not different from that of a conventional electrical injection molding machine in which the PC CPU 26 controls the sequential motions of the injection molding machine, the CNC CPU 29 controls molding operations. In connection with the present invention, the CNC CPU 27 distributes motion commands to the servomotor 9 and the servo CPU 22 performs a servo control, so called as digital servo processing, including a position loop control, a velocity loop control and a current loop control based on the distributed motion commands and the feedback signals of position and velocity from the position/velocity detector 10, to drivingly control the servomotor 9 to perform an ejection of a molded product from the mold 1.

Figure 2:
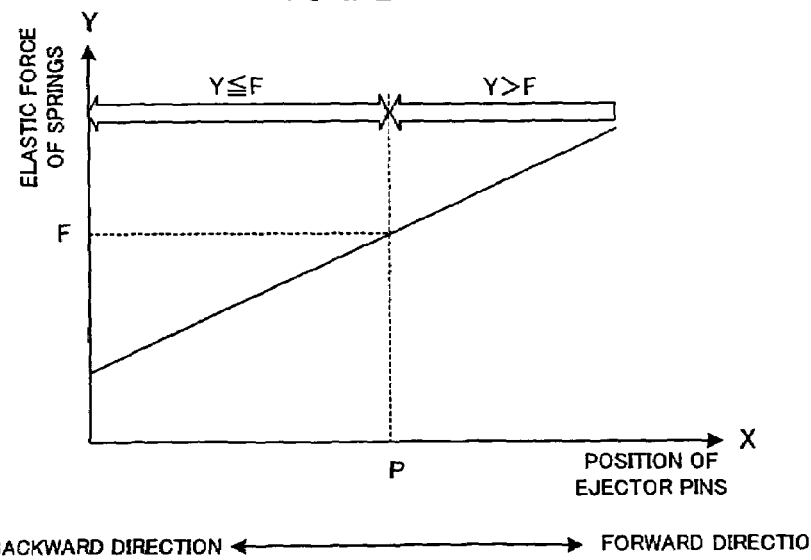
FIG. 2 is a diagram showing a principle of the present invention.

FIG. 2 shows the elastic force of the springs 4 varying with the position of the ejector pins 3 in comparison with the retaining force of the brake device built in the servomotor 9 to explain a principle of the present invention. In FIG. 2, an axis of abscissa represents a position of the ejector pins 3 in a forward motion thereof, and an axis of ordinate represents an elastic force of the springs 4 varying with the forward motion of the ejector pins 3.

The ejector pins 3 and the ejector plate 2 are urged to a backward end position in a motion stroke by the springs 4, and compression of the springs 4 increases with the forward motion of the ejector pins 3 (with the ejector rod 5 and the ejector plate 2) so that the elastic force of the springs 4 increases linearly according to a spring constant. If a terminal position of the forward motion of the springs is set in a region where the elastic force Y of the springs 4 is equal to or lower than the retaining force Fb of the brake device provided in the servomotor 9, the retaining force of the brake device is sufficient to retain the ejector pins at the terminal position to cause no problem. However, if the terminal position of the forward motion of the ejector pins 3 is set in a region where the elastic force Y of the springs 4 exceeds the retaining force F of the brake device, the retaining force of the brake device F is insufficient to retain the ejector pins firmly at the terminal position to cause the friction members of the brake device to be worn excessively. Thus, according to the present invention, a position of the ejector pins 3 where the springs 4 generate an elastic force equivalent to the retaining force F of the brake device is determined as a criterial position P of the terminal position of the forward motion of the ejector pins 3, for setting the terminal position closer to the retracted position (the backward end position of the motion stroke) than the criterial position P.

Figure 3:
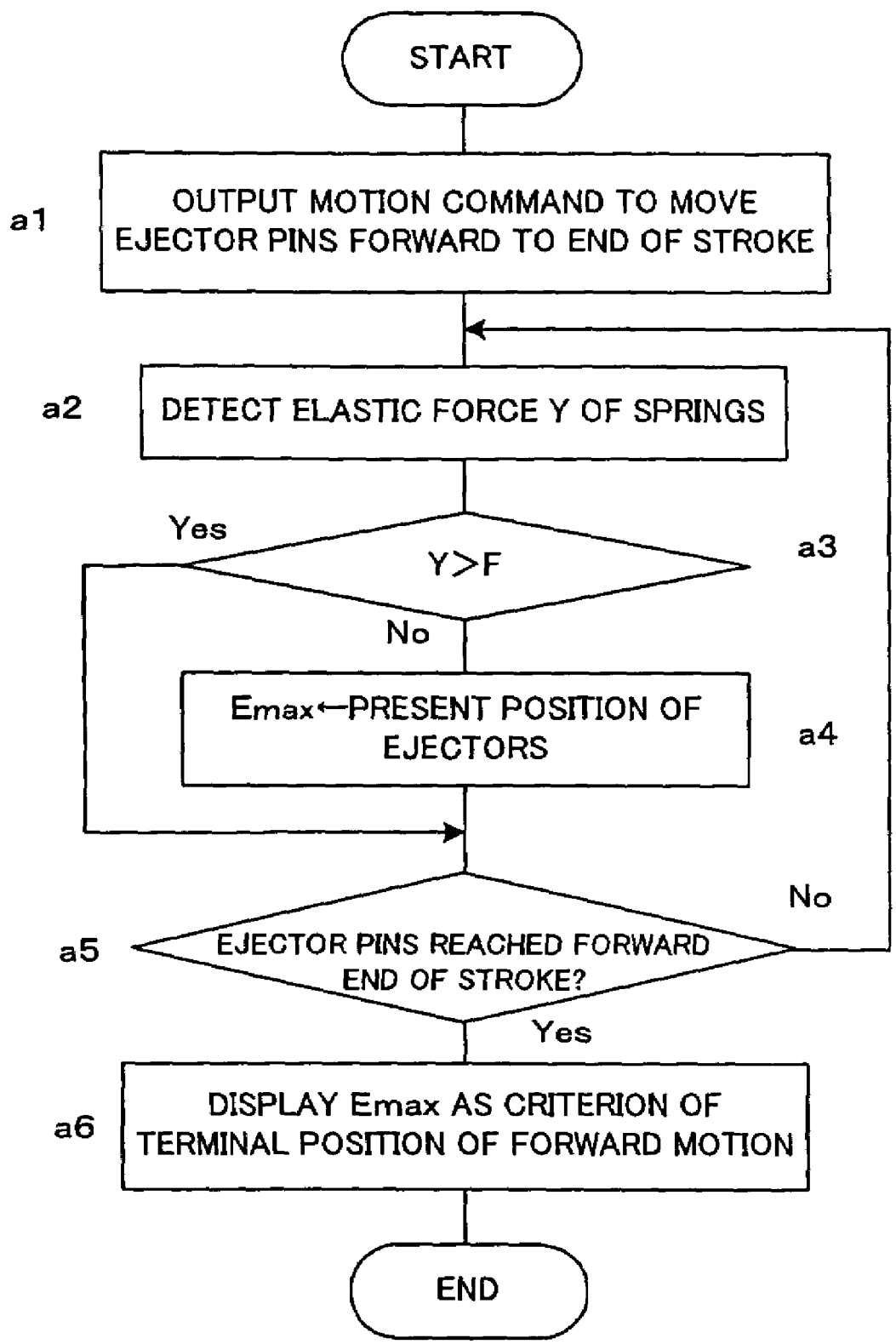
FIG. 3 is a flowchart of processing to be performed by a processor of the ejector controller according to a first embodiment of the present invention.

FIG. 3 shows processing to be performed by the CNC CPU 27 for setting the terminal position of the forward motion of the ejector pins according to a first embodiment of the present invention.

In a state where there is no molded product in a mold, e.g. immediately after attaching a mold to an injection molding machine, and thus the ejector pins 3 come in contact with no molded product in a forward motion, when a command to determine a criterial position is inputted from the display/MDI device 29, the CNC CPU 27 performs the processing of algorism as shown in FIG. 3.

The CNC CPU 27 outputs a motion command to move the ejector pins 3 forward to a forward end position of a motion stroke of the ejector pins 3. The servo CPU 22 performs feedback controls of position and velocity to drive the servomotor 9 through the servo amplifier 21 according to the motion command (Step a1). Then, the CNC CPU 27 detects the elastic force of the springs 4 (Step a2). The elastic force is detected based on a driving current of the servomotor 9. Since there is no molded product in the mold 1 and thus the ejector pins 3 do not eject any molded product in the forward motion, a load exerted on the servomotor 9 is an elastic force generated by the springs 4 of the ejector mechanism. Since the driving current of the servomotor 9 is proportional to the load exerted on the servomotor 9, the elastic force of the springs 4 can be detected based on the driving current of the servomotor 9.

Instead of detecting the elastic force of the springs 4 based on the driving current of the servomotor 9, the elastic force of the springs 4 may be detected by a strain gauge attached to the ejector rod 5 for detecting a load exerted on the ejector rod 5.

Further, various types of disturbance estimating observers for estimating disturbance load exerted on the servomotor are known in the art. For instance, there is known an observer for estimating a load on a servomotor based on a current command to the servomotor and an actual velocity of the servomotor. Such an observer (constituted by software) may be incorporated into a program for the servo CPU 22 for controlling the servomotor 9, to detect the load exerted on the servomotor 9, i.e. the elastic force of the springs 4.

Thus detected elastic force Y of the springs 4 is compared with the retaining force F of the brake device (Step a3), and if the detected elastic force Y is smaller than the retaining force F, a present position of the ejector pins 4, which is stored in a present position storage register based on a feedback signal form the position/velocity detector 10, is set to a register Emax (Step a4). Then, it is determined whether or not the ejector pins reach the forward end of the stroke commanded in Step a2 (Step a4), and if not, the procedure returns to Step a2 to execute the processing of Step a2 and subsequent Steps.

With the above procedure, the position of the ejector pins is updated and stored in the register Exam on condition that the detected elastic force Y is smaller than the retaining force F of the brake device. On the other hand, if it is determined that the elastic force Y exceeds the retaining force F of the brake device, the updating of the register Emax of Step a4 is not performed and the procedure proceeds from Step a3 to Step a5. Thus, the position of the ejector pins immediately before the elastic force Y exceeds the retaining force F is stored in the register Emax.

When it is determined that the ejector pins 3 reach the forward end position of the motion stroke at Step a5, the procedure proceeds to Step a6 where the position of the ejector pins stored in the register Emax is displayed as the criterial position of the ejector pins on the display/MDI device 29.

Since the displayed criterial position of the ejector pins 3 is the most forwarded position under the condition where the elastic force is not greater than the retaining force of the brake device, an operator sets the terminal position of the forward motion of the ejector pins 3 to a position not exceeding the displayed criterial position. Thus, the terminal position of the forward motion of the ejector pins 3 is set to a position where the elastic force of the springs 4 does not exceed the retaining force of the brake device.

In the above first embodiment, when the elastic force is smaller than the retaining force of the brake device, the present position of the ejector pins 3 is stored in the register Emax so that the position of the ejector pins just one processing period before the elastic force exceeds the retaining force of the brake device (i.e. at this position the elastic force does not exceed the retaining force) is determined. Alternatively, the position of the ejector pins first time when the elastic force exceeds the retaining force of the brake device may be stored in the register Emax. For instance, in the processing of FIG. 3, when it is determined that the elastic force Y exceeds the retaining force F at Step a3, the procedure may proceed to Step a4 where the present position of the ejector pins 3 is stored in the register Exam and a flag is set to "1", and after the flag is set the procedure proceeds to Step a5 where it is determined whether or not the ejector pins reaches the forward end of the motion stroke.

In this case, since the position of ejector pins 3 stored in the register Emax when the elastic force Y of the springs exceeds the retaining force E of the brake device for the first time is displayed on the screen of the display/MDI device 29, it is necessary to set the terminal position of the forward motion of the ejector pins closer to the retracted position than the displayed criterial position.

Figure 4:
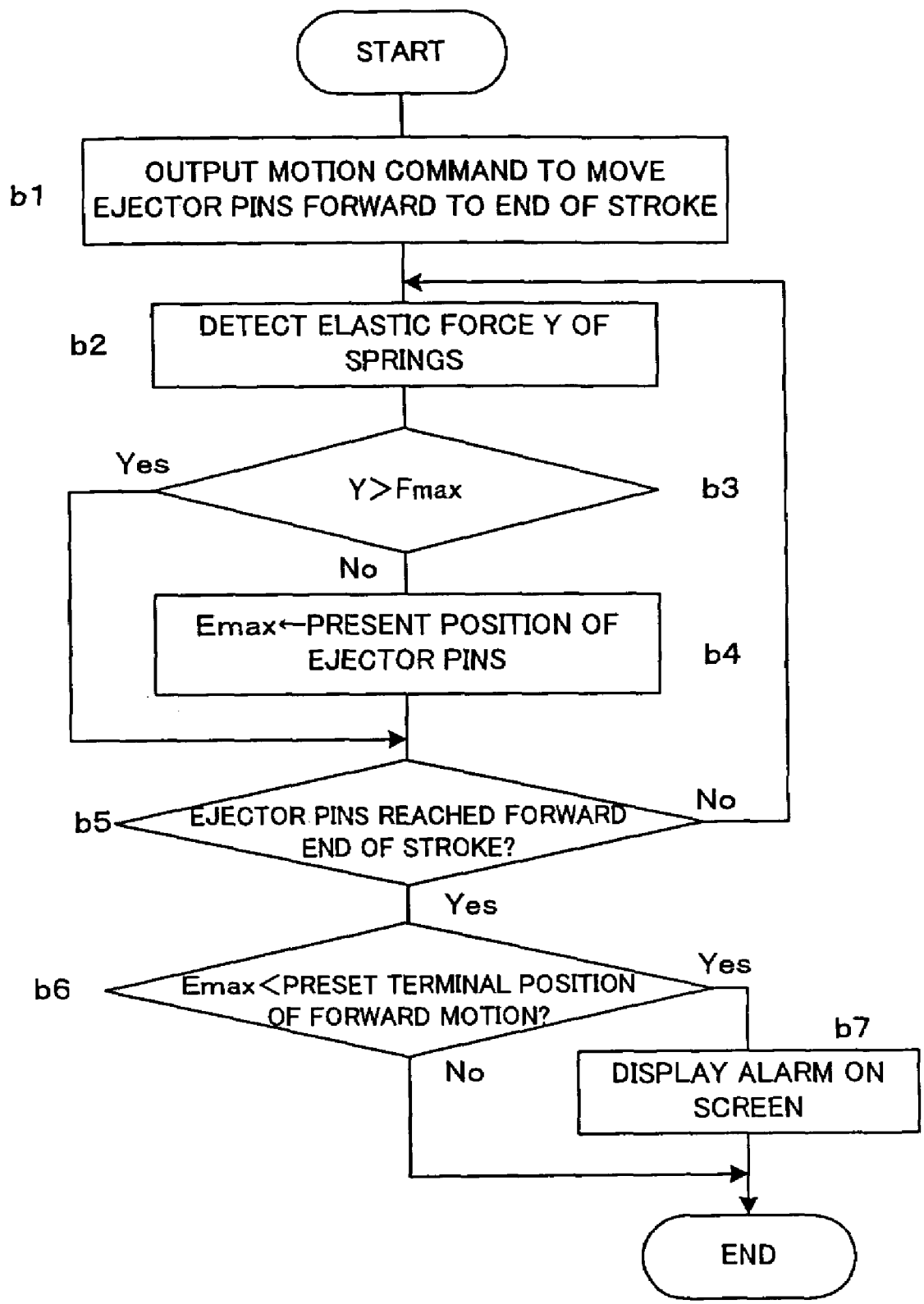
FIG. 4 is a flowchart of processing to be performed by the processor of the ejector controller according to a second embodiment of the present invention.

FIG. 4 show processing according to a second embodiment of the present invention. In this second embodiment, it is determined whether or not a preset terminal position of the forward motion of the ejector pins 3 is appropriate.

In FIG. 4, the processing of Step b1 to Step b5 is the same as that of Step a1 to Step a5 of FIG. 3 in which the position of the ejector pins 3 immediately before the elastic force of the springs 4 exceeds the retaining force of the brake device is stored in the register Emax. After driving the servomotor to move the ejector pins to the forward end of the motion stroke of the ejector pins 3, the position of the ejector pins 3 stored in the register Emax is compared with a preset terminal position of the forward motion of the ejector pins 3 in Step b6. If the preset terminal position of the forward motion of the ejector pins 3 is remoter from the retracted position than the position of the ejector pins 3 stored in the register Emax, an alarm is issued and displayed on a screen of the display/MDI device 29 (Step b7). In this case, the preset terminal position of the forward motion of the ejector pins 3 is remoter than the position of the ejector pins 3 where the springs 4 generate elastic force exceeding the maximum braking force of the brake device, and therefore an alarm is issued to caution that the preset terminal position is inappropriate to be a cause of excessive wearing of friction members such as brake pad or shoe of the brake device. As contents of the alarm, it is desirable a message prompting a change of setting of the terminal position of the forward motion of the ejector pins or replace the springs to ones having appropriate spring constants.

In this second embodiment also, the position of the ejector pins when the elastic force of the springs first exceeds the maximum braking force may be stored in the register Emax, as in the first embodiment.

Figure 5:
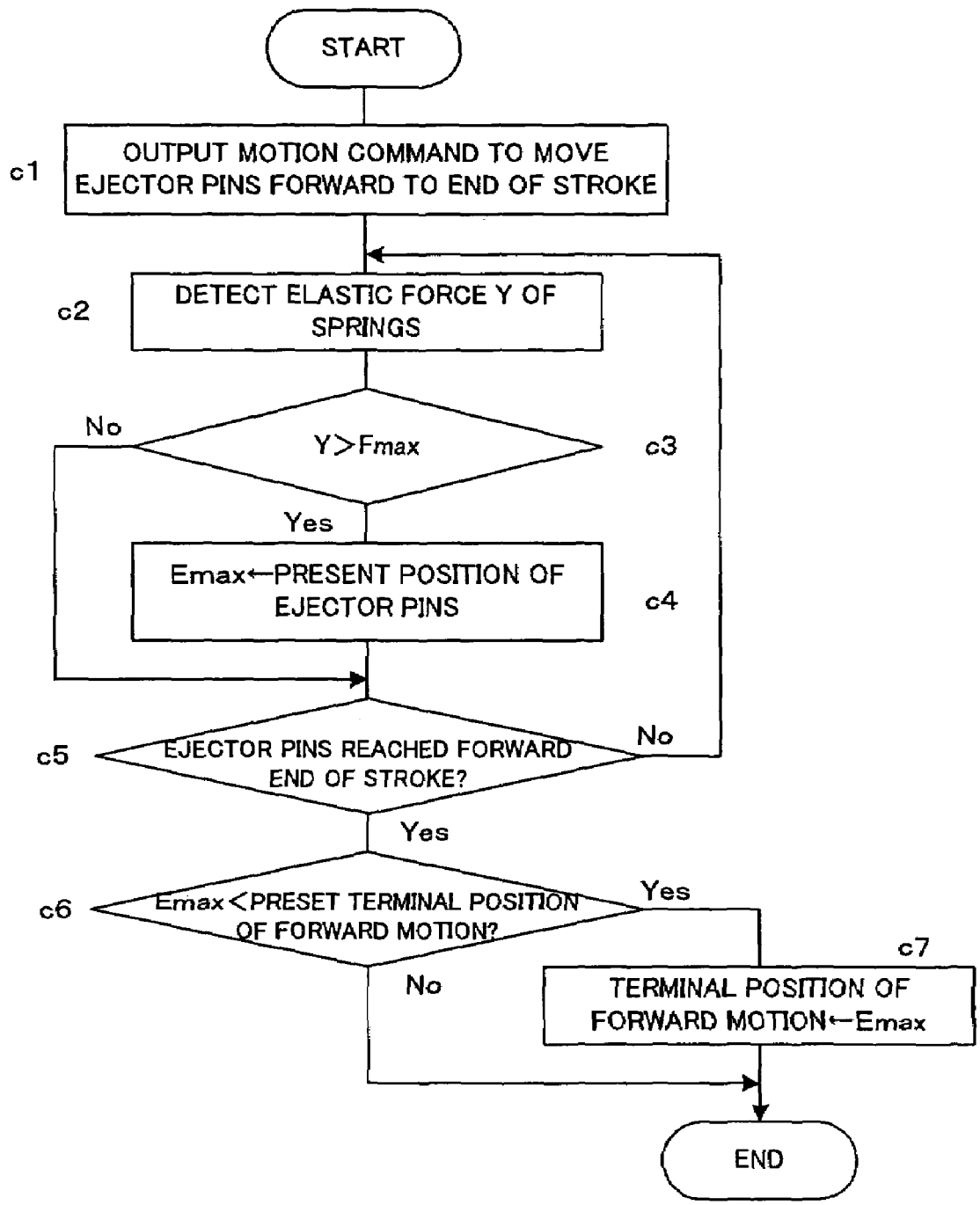
FIG. 5 is a flowchart of processing to be performed by the processor of the ejector controller according to a third embodiment of the present invention.

FIG. 5 is a flowchart of processing according to a third embodiment.

In this third embodiment, if the preset terminal position of the forward motion of the ejector pins is a position where the springs generate an elastic force exceeding the retaining force of the brake device, the terminal position of the forward motion of the ejector pins is automatically re-set to a position immediately before the position where the springs generate an elastic force exceeding the retaining force of the brake device.

In this third embodiment, the processing of Step c1 to Step c5 is the same as the processing of Step a1 to Step a5 in the first embodiment as shown in FIG. 3 and the processing of Step b1 to Step b5 in the second embodiment as shown in FIG. 4.

In this embodiment, the position of the ejector pins immediately before the springs generate an elastic force exceeding the retaining force of the brake device (the elastic force detected one period before the elastic force exceeds the retaining force of the brake device, which is smaller than the retaining force) is compared with the preset terminal position of the forward motion of the ejector pins (Step c6). If the preset terminal position of the forward motion of the ejector pins is the same as or closer to the retracted position than the position stored in the register Emax, the procedure terminates without changing the preset terminal position of the forward motion of the ejector pins. On the other hand, if the preset terminal position of forward motion of the ejector pins is not less than the position stored in the register Emax, the preset terminal position is changed to the position stored in the register Emax (Step c7).

The fact that the preset terminal position of forward motion of the ejector pins exceeds the position stored in the register Emax means a cause of wearing of the brake device since the brake device can not firmly retain the set terminal position of the forward motion of the ejector pins when the ejector pins 3 are moved to the set terminal position. Therefore, the preset terminal position of the forward motion of the ejector pins is automatically altered to the position stored in the register Emax. Depending on size and design of the mold, a molded product can not be ejected from the mold at the altered terminal position of the forward motion of the ejector pins and therefore it is desirable to indicate a message to prompt change to springs of appropriate spring constants on the screen of the display/MDI device 29 when the preset terminal position is altered.

In the above embodiments, the elastic force of the springs is detected during the forward motion of the ejector pins from the backward end to the forward end of the motion stroke to determine a position of the ejector pins where the elastic force of the springs exceeds the retaining force of the brake device. However, the elastic force of the springs may be detected during operating the servomotor 9 for driving the ejector pins by a predetermined amount, and if the detected elastic force of the springs does not exceed the retaining force of the brake device, the elastic force of the springs is detected while driving the servomotor 9 by the predetermined amount again to detect a position where the elastic force of the springs exceeds the retaining force of the brake device. Based on the detected position, the terminal position of the forward motion of the ejector pins may be set.

Further, in the above embodiments, the servomotor is adopted as a driving source for moving the ejector pins forward. The present invention may be applied to an ejector mechanism in which a hydraulic cylinder or a linear motor is used as the driving source. Moreover, the brake device is built in the servomotor in the above embodiments, however, the brake device may be provided at a transmission member provided between the driving source and the ejector rod for transmitting a driving force to drive the ejector mechanism.

What is claimed is:

1. A controller for controlling an ejector mechanism of an injection molding machine having means for moving ejector pins forward to project into a mold, springs for generating an elastic force to return the ejector pins to a retracted position, and brake means for generating a retaining force to retain the ejector pins at a terminal position of the forward motion, said controller comprising:

position detecting means for detecting a position of the ejector pins;

elastic force detecting means for detecting an elastic force of the springs during a forward motion of the ejector pins from the retracted position;

determining means for determining a criterial position of the ejector pins where the detected elastic force of the springs is equivalent to the retaining force of the brake means; and display means for displaying the detected criterial position of the ejector pins for setting the terminal position of the forward motion of the ejector pins.

2. A controller for controlling an ejector mechanism of an injection molding machine having means for moving ejector pins forward to project into a mold, springs for generating an elastic force to return the ejector pins to a retracted position, and brake means for generating a retaining force to retain the ejector pins at a terminal position of the forward motion, said controller comprising:

position detecting means for detecting a position of the ejector pins;

elastic force detecting means for detecting an elastic force of the springs during a forward motion of the ejector pins from a retracted position;

determining means for determining a criterial position of the ejector pins where the detected elastic force of the springs is equivalent to the retaining force of the brake means; and means for issuing an alarm if a preset terminal position of the forward motion of the ejector pins is remoter from the retracted position than the criterial position of the ejector pins.

3. A controller for controlling an ejector mechanism of an injection molding machine having means for moving ejector pins forward to project into a mold, springs for generating an elastic force to return the ejector pins to a retracted position, and brake means for generating a retaining force to retain the ejector pins at a terminal position of the forward motion, said controller comprising:

position detecting means for detecting a position of the ejector pins;

elastic force detecting means for detecting an elastic force of the springs during a forward motion of the ejector pins;

determining means for determining a position of the ejector pins immediately before the detected elastic force of the springs exceeds the retaining force of the brake means in the forward motion of the ejector pins; and means for altering a preset terminal position of the forward motion of the ejector pins to be the determined position, if the preset terminal position of the forward motion the ejector pins is remoter from the retracted position than the determined position.

4. A controller according to any one of claims 1 to 3, wherein said elastic force detecting means detects the elastic force of the springs based on a electric current of a servomotor for driving the ejector pins to move forward.

5. An ejector controller according to any one of claims 1 to 3, wherein said elastic force detecting means detects the elastic force of the springs by an observer for estimating a load exerted on a servomotor for driving the ejector pins to move forward.

6. An ejector controller according to any one of claims 1 to 3, wherein said elastic force detecting means detects the elastic force of the springs by a strain gauge provided in the ejector mechanism.

* * * * *